(12) United States Patent
Meissner et al.

(10) Patent No.: US 8,419,577 B2
(45) Date of Patent: Apr. 16, 2013

(54) PROPULSION SYSTEM FOR ALL-WHEEL DRIVE MOTOR VEHICLES

(75) Inventors: Tim Christopher Meissner, Ingolstadt (DE); Johann Fuchs, Ingolstadt (DE); Ralf Schwarz, Ingolstadt (DE); Johann Maerkl, Ingolstadt (DE); Christian Meixner, Ingolstadt (DE)

(73) Assignee: Audi AG, Ingolstadt (DE)

( * ) Notice: Subject to any disclaimer, the term of this patent is extended or adjusted under 35 U.S.C. 154(b) by 488 days.

(21) Appl. No.: 12/729,343

(22) Filed: Mar. 23, 2010

(65) Prior Publication Data

US 2010/0170737 A1    Jul. 8, 2010

Related U.S. Application Data

(62) Division of application No. 11/727,088, filed on Mar. 23, 2007, now Pat. No. 8,187,131.

(30) Foreign Application Priority Data

Mar. 24, 2006    (DE) .......................... 10 2006 013 542

(51) Int. Cl.
*B62D 11/06*    (2006.01)
(52) U.S. Cl.
USPC ............................................................ 475/19
(58) Field of Classification Search .................... 475/18, 475/19, 199, 202, 203, 222, 225, 223
See application file for complete search history.

(56) References Cited

U.S. PATENT DOCUMENTS

| 4,973,296 | A  | * | 11/1990 | Shibahata ..................... 475/231 |
| 4,982,809 | A  | * | 1/1991  | Nakamura et al. ............ 180/248 |
| 5,647,815 | A  | * | 7/1997  | Bowerman et al. ........... 475/249 |
| 5,742,917 | A  | * | 4/1998  | Matsuno ......................... 701/69 |
| 5,957,801 | A  | * | 9/1999  | Barnes, II ..................... 475/249 |
| 7,331,896 | B1 | * | 2/2008  | Kroppe ......................... 475/221 |
| 2006/0207854 | A1 | * | 9/2006 | Baasch et al. ................ 192/48.2 |

FOREIGN PATENT DOCUMENTS

DE    39 12 349 A1    11/1989
DE    42 13 435 A1    10/1992
(Continued)

*Primary Examiner* — Justin Holmes
(74) *Attorney, Agent, or Firm* — Novak Druce Connolly Bove + Quigg LLP

(57) ABSTRACT

The invention relates to a propulsion system for all-wheel drive motor vehicles, having a device for propulsion distribution to the front and the rear differential which transmit the drive output to the wheels assigned at the time, and with a device for coupled, variable distribution of the propulsion forces in the transverse and longitudinal directions of the vehicle depending on the operating situation of the vehicle for influencing the driving behavior, especially for improving the driving agility and driving stability. In the process the rear differential (18) is combined with an overriding drive (22), by means of which the drive torques can be shifted to the rear wheels (20) in alternation in the transverse direction of the vehicle, the rpm ratio or rpm error being dictated by means of the overriding drive (22) at the design point so that at a given curve radius which is assigned to the design point and which does not correspond to the narrowest curve, a reversal of the direction of the rotational speed difference takes place and thus the torque is not shifted to the wheel on the outside of the curve. By means of the propulsion distribution device (24, 26; 44, 46; 52) the drive torques can be shifted in alternation between the front differential (14) and rear differential (18) in the longitudinal direction of the vehicle.

9 Claims, 4 Drawing Sheets

FOREIGN PATENT DOCUMENTS

Figure 1:
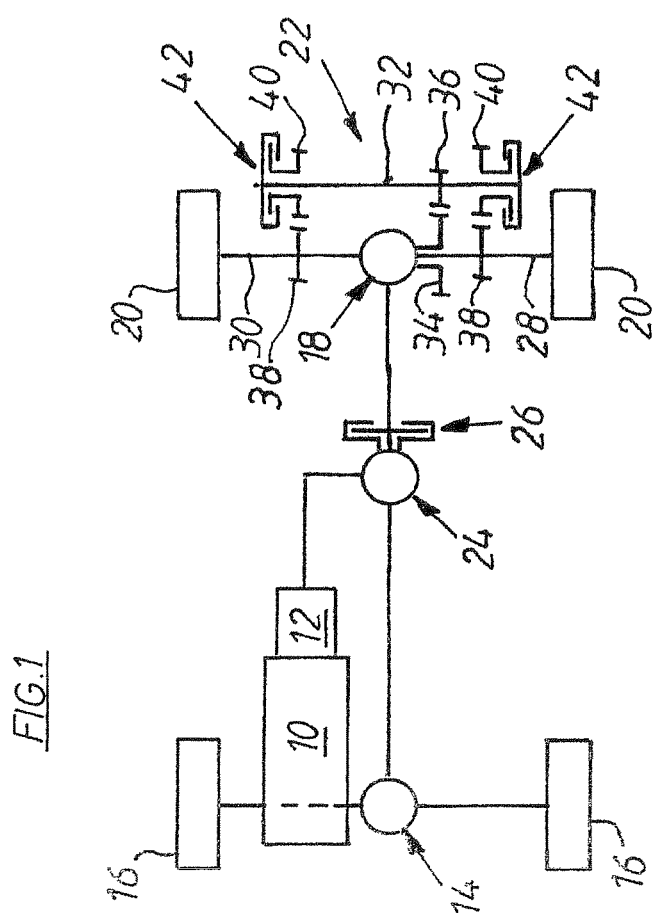

| | | |
|---|---|---|
| DE | 39 00 638 C2 | 6/1994 |
| DE | 0 844 416 B1 | 1/2002 |
| DE | 101 30 878 A1 | 5/2002 |
| DE | 103 44 972 A1 | 4/2005 |
| DE | 10 2004 004 871 A1 | 8/2005 |
| WO | 2005043008 A1 | 5/2005 |

* cited by examiner

PROPULSION SYSTEM FOR ALL-WHEEL DRIVE MOTOR VEHICLES

This is a Divisional application of application Ser. No. 11/727,088 filed on Mar. 23, 2007 now U.S. Pat. No. 8,187,131, hereby incorporated by reference in its entirety. application Ser. No. 11/727,088 claims priority from German Application No. 10 2006 013 542.3, filed Mar. 24, 2006, hereby incorporated by reference in its entirety.

The invention relates to a propulsion system for all-wheel drive motor vehicles as specified in the preamble of claim 1.

Such a propulsion system is described in DE 39 00 638 C2, in which a front and a rear differential are driven by way of an interaxle differential. The rear differential furthermore has an overriding drive by means of which the drive torque on the rear wheels of the vehicle can be varied. Thus, for example, a higher drive torque can be routed to the rear wheel of the vehicle which is on the outside of the curve and which is subjected to a higher wheel load and thus can increase the traction and cornering stability.

The object of the invention is to propose a propulsion system of the generic type which enables further improvements of driving dynamics by the corresponding layout.

This object is achieved according to the invention with the features specified in claim 1. Advantageous developments of the invention are the subject matter of the dependent claims.

According to the invention, a means for coupled, variable distribution of the propulsion forces in the transverse and longitudinal directions of the vehicle depending on the operating situation of the vehicle is proposed which is used to influence driving behavior, especially to improve driving agility and driving stability. In this connection the rear differential is combined with an overriding drive, by which the drive torques can be shifted to the rear wheels in alternation in the transverse direction of the vehicle, the rpm ratio or rpm error being dictated by means of the overriding drive, in particular by way of the clutches there, at the design point so that at a given curve radius which is assigned to the design point and which does not correspond to the narrowest curve a reversal of the direction of the rotational speed difference takes place and thus the torque is not shifted to the wheel on the outside of the curve. When driving through a narrower curve, in other words the torque can thus no longer be shifted to the wheel on the outside of the curve, since the direction of the rotational speed difference has been reversed. Moreover by means of the propulsion distribution device the drive torques can be shifted in alternation between the front differential and rear differential in the longitudinal direction of the vehicle. Alternating shifting of torque is defined as the fundamental possibility of shifting the torque to the left and right and forward and backward. This concept comprises in addition to the case of alternating torque distribution, for example alternating from left to right, of course also those cases in which the torque is shifted repeatedly in succession in the same direction, for example several times to the left in succession.

With the rear axle differential, driving agility can be distinctly improved by shifting the torque to the outside and thus understeering situations can be managed better overall. With the rear axle differential however the driving stability in oversteering situations can only be improved to a limited degree. Here the use according to the invention of a mid-differential which shifts the drive torque forward to the front axis can remedied, since in this way oversteering situations can be managed much better.

In particular, in addition to the possibilities of an overriding drive on the rear axle of the vehicle and the associated torque distribution in the crosswise direction, shifting of the total drive torque increasingly to the front wheels is advantageous when for example an oversteering situation is recognized by the yaw rate sensor and the maximum allowable slip values are reached on the rear wheels both on the rear wheel on the inside of the curve and/or the one on the outside of the curve and thus advantages in driving dynamics can no longer be exhausted. In defined operating situations of the vehicle then shifting of the drive torque to the front wheels yields additional stabilization and improvement of driving behavior of the vehicle with respect to driving dynamics.

The propulsion distribution device can advantageously be an interaxle differential which can preferably be locked by a clutch, with an asymmetrical, especially rear-emphasized basic distribution of for example 30%:70%. By closing the clutch at least in the slip region thus the drive torque on the front axle can be easily increased for example to 50:50 besides a conventional longitudinal differential lock.

Preferably the propulsion distribution device is an interaxle differential which can be locked via a clutch, the front differential and the rear differential having different, especially slightly different transmission ratios, for example of less than 10%, so that with increasing locking of the interaxle differential the drive torque is increasingly routed to the front differential. Depending on the slip state of the clutch this enables continuous drive torque distribution of the basic distribution of for example 50:50 to 100% on the front axle. Basically a drive torque distribution can also be provided in the reverse direction, for example by the drive torque being increasingly routed to the rear differential by the appropriately configured embodiments. The clutch can be a controlled, fluid-activated, multiple-disk clutch in the conventional manner.

Alternatively, for essentially the same transmission ratios between the rear and the front differential, between the mid-differential and the clutch there can also be an auxiliary gear for producing a defined rotational speed difference in the clutch, and the counterstage forming the auxiliary gear can be designed as a ring gear stage, planetary gear or as a spur gear stage.

What was stated above with respect to special driving situations, especially oversteering and understeering cases, also applies essentially to the case of another alternative embodiment, in which the propulsion distribution device is formed by two clutches as a mid-differential which are located in the drive line to the front differential and to the rear differential and by means of which the propulsion output to be transmitted can be applied. Thus an interaxle differential can be omitted and the drive torque distribution can be controlled with the greatest degrees of design freedom between 0 and 100% both to the front axle and also to the rear axle.

The two clutches can be hydraulically activated, multiple disk clutches located in a drive casing connected downstream of the change speed gear box. Here one of the clutches can be designed moreover as the starting clutch of the vehicle especially advantageously in terms of construction and production engineering, as a result of which the production cost of the propulsion system can be reduced.

In a manner which is especially advantageous for driving dynamics, with the above described embodiments the clutches can be controlled for an ascertained or detected, defined oversteering tendency of the vehicle when driving through curves such that the drive torque of the rear differential is reduced and the drive torque of the front differential is increased. Thus an unallowable oversteering tendency can be effectively counteracted by the drive torque on the rear wheels of the vehicle being taken back at least in the boundary case and increasingly shifted to the front wheels. Thus, in situations in which the rear differential has little potential for stabilization, therefore for example oversteering, the drive torque can be shifted forward by closing the clutch in the mid-differential and thus the vehicle can be stabilized.

Furthermore the clutches for an ascertained or detected defined understeering tendency of the vehicle when driving through curves can be controlled such that the drive torque of the front differential is reduced or the drive torque of the rear differential is increased. The vehicle can thus be set to an understeering, neutral or even if so desired a sport-oversteering driving behavior, parameters such as speed, steering angle, yaw rate, acceleration or deceleration, etc., being measured by instruments and processed accordingly in an electronic control device.

Advantageously the propulsion distribution device can be connected using control engineering to an electronic driving stability program (for example ESP) or electronic antislip control (for example ASR) of the vehicle, then the means which are present already including the control device also controlling the drive torque distribution as described above by activation of the corresponding clutches.

In a configuration of the invention which is especially simple in terms of construction and control engineering, finally the propulsion distribution device can be a torque-sensing, self-locking differential, for example a self-locking Torsen differential. This drive line design with a self-controlling, torque-sensing, passive mid-differential and an active axle differential, especially a rear axle differential, is possible since the transversely transmitted torque in the axle differential is independent of the input torque. The torque-sensing passive mid-differential supports the effectiveness of the overriding differential in the case of understeering by shifting the drive torque to the rear axle. In the oversteering case conversely the torque-sensing mid-differential stabilizes the vehicle. Furthermore the coupling of the passive mid-differential with an active axle differential results in that by shifting the drive torque from the inner to the outer wheel on the for example rear axle the medium slip on the rear axle tends to become smaller than on the front axle, by which the mid-differential shifts more torque to the rear axle. Both effects increase agility and in interaction cause a major functional advantage. This combination of a passive, torque-sensing mid-differential with an active axle differential is moreover structurally simple and thus can be economically produced since in contrast to other systems two electronic interacting differentials are not necessary.

Several embodiments of the invention will be explained below with further details. The drawings are schematic.

Figure 2:
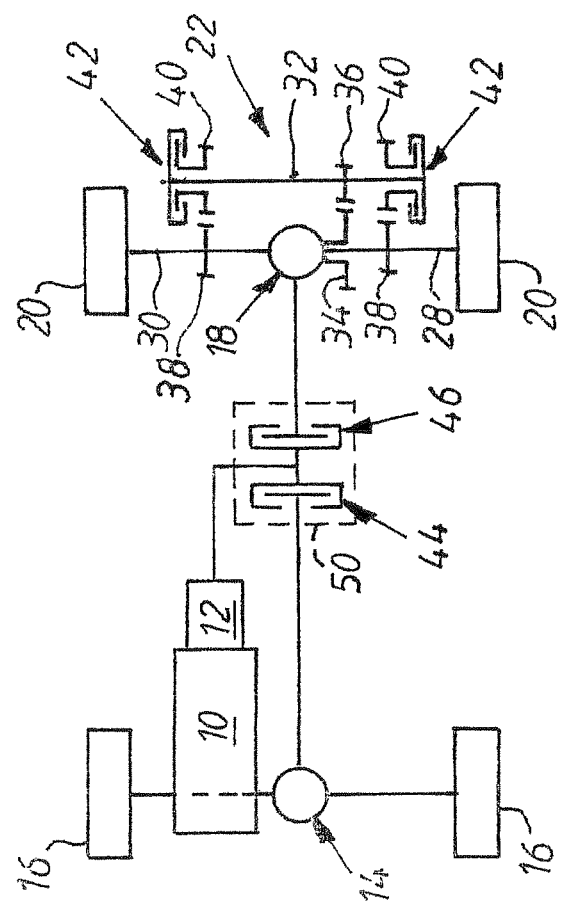
Figure 3:
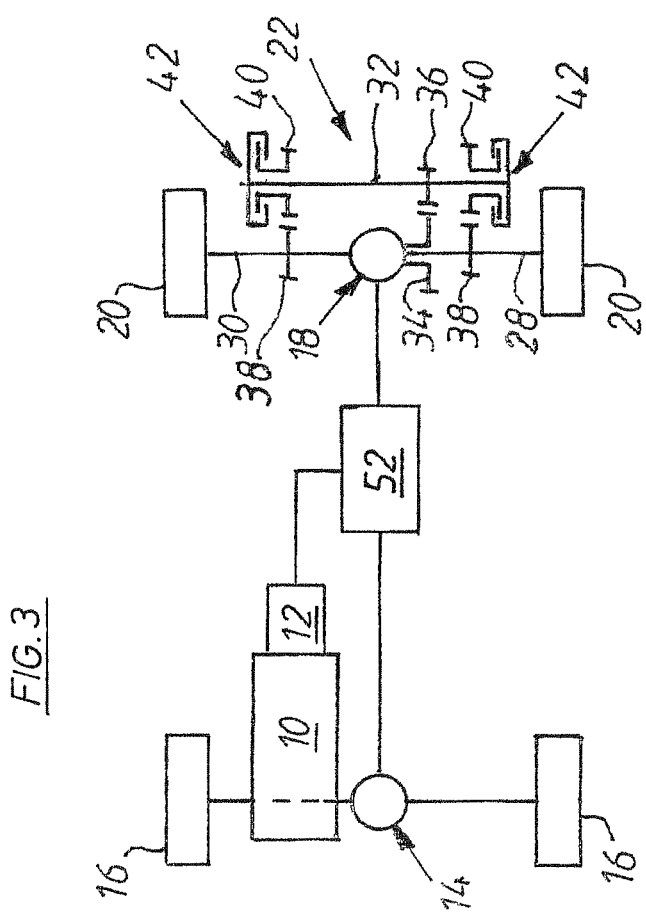
Figure 4:
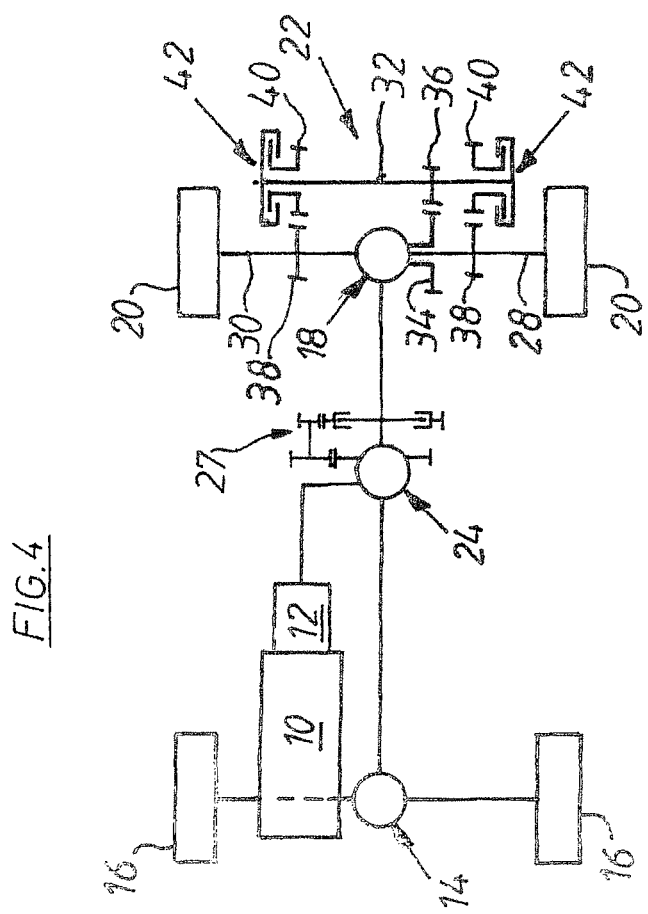

FIG. 1 shows a first propulsion system for an all-wheel drive vehicle, with a drive engine, a speed change gearbox, a front differential, a rear differential combined with an overriding drive, and a propulsion distribution device with an interaxle differential and hydraulically actuated multiple disk clutch, FIG. 2 shows a second propulsion system as shown in FIG. 1 with a propulsion distribution device with two hydraulically actuated clutches, FIG. 3 shows a third drive system as shown in FIG. 1, but with a self-locking Torsen differential as the propulsion distribution device, and FIG. 4 shows a fourth propulsion system as shown in FIG. 1, with an auxiliary gear for producing a defined rotational speed difference.

The propulsion system for an all-wheel drive vehicle is composed essentially of a drive engine or internal combustion engine 10, a change speed gearbox 12, a front differential 14 for driving the front wheels 16 of the vehicle, a rear differential 18 for driving the rear wheels 20 of the vehicle, an overriding drive 22 combined with the rear differential 18, and a propulsion distribution device between the front differential 14 and the rear differential 18 with an interaxle differential 24 and a hydraulically actuated multiple disk clutch 26.

The cited components of the propulsion system, to the extent that they are not described, are of a design familiar to one skilled in the art. The change speed gearbox 12 can be a manual transmission, an automatic transmission, etc. The differentials 14, 18 and 24 can be spur gear differentials or bevel wheel differentials. The slip-controlled multiple disk clutch 26 can be of conventional design and can be propulsively configured such that it connects two elements of the interaxle differential 24 in the closed state and acts as a differential lock.

The overriding drive 22 can be of conventional design, for example with a countershaft 32 which is parallel to the driven shafts 28, 30 of the rear differential 18, which is pivoted in a housing which is not shown, and which is driven via a gear set with gears 34, 36 by a with the differential case (not shown) of the differential 18 with a higher rpm than the driven shafts 28, 30.

The countershaft 32 in turn is propulsion-connected via gear sets 38, 40 to the two driven shafts 28, 30, the gears 40 being floating gears which can be coupled in alternation to the countershaft 32 via hydraulically slip-controlled multiple disk clutches 42. The transmission ratios of the gear sets 38, 40 are different from the gear set 34, 35 driving the countershaft 32 such that for closing of the multiple disk clutches 42 which is slip-controlled in alternation, additional drive torque can be routed to one driven shaft 28, 30 or the other. For example, reference is made to EP 0 844 416 B1 only by way of example for the specific construction of such an overriding drive 22.

In this way for example when driving through a curve a higher drive torque can be routed to the rear wheel 20 on the outside of the curve than to the rear wheel 20 on the inside of the curve and vice versa. Rpm differences between the front differential 14 and the rear differential 18 are balanced via the interaxle differential 24.

For further driving-dynamics influencing of the driving behavior of the vehicle with the propulsion distribution device the interaxle differential 24 is designed with a basic distribution of for example 30% to the front differential 14 and then 70% to the rear differential 18, that is, for example rear-loaded. By more or less strong closing of the multiple disk clutch 26 the drive torque distribution can be changed to for example 50:50, that is, drive torque can be routed increasingly to the front differential 14.

The axle differentials 14 and 18 can be designed fundamentally with different transmission ratios of for example 35:9 forward and 37:9 to the rear. The resulting rpm difference in the drive line is balanced via the interaxle differential 24.

If the slip-controlled multiple disk clutch 26 is increasingly closed, in an example of a rear-emphasized basic distribution as a result of the direct transmission of the front differential 14 there is increased redirection, preferably up to 100% of the drive torque to the front differential 14 and the rear differential 18 is accordingly relieved. With a rear-emphasized basic distribution and a different transmission ratio a large drive torque range can be electronically controlled with technically simple means, from preferably 100:0 to the basic design. This applies analogously to a front-emphasized basic distribution and different transmission ratios.

The hydraulically actuated clutches 26, 42 can be triggered via a uniform, electronic control device (not shown) in which the speed of the vehicle, the steering angle of the front steerable wheels 16, wheel accelerations or decelerations, yaw rate, etc. are detected in the conventional manner by way of the corresponding sensors and logically combined, and hydraulic control valves for activation of the clutches 26, 42 are actuated via output amplifiers. The electronic control device can conventionally be the control device of an electronic driving stability program (for example ESP) or anti-slip control (ASR) of the vehicle so that the added control engineering cost is distinctly reduced.

Programming of the electronic control device for example results in that for an oversteering tendency of the vehicle above a defined threshold when driving through curves (detectable by the steering angle of the vehicle steering, the yaw rate, acceleration values of the rear wheels 20, etc.) the multiple disk clutch 26 is controlled, for example by the closing the clutch 26 in the slip region, such that the drive torque of the rear differential 18 is reduced or the drive torque of the front differential 14 is increased. This reduces the oversteering tendency and when certain boundary values are reached improves the cornering stability of the vehicle.

Furthermore, for an understeering tendency of the vehicle above a certain threshold when driving through curves the multiple disk clutch 26 is for example fully opened so that the drive torque of the front differential 14 is reduced within the framework of the basic design and the drive torque of the rear differential 18 is increased.

In addition to these described intervention possibilities, to increase the drive torque of the front differential 14 other interventions can be controlled, for example at different speeds (for example, higher drive torque on the front axle at high vehicle speeds) or under unfavorable roadway conditions (hydroplaning, black ice, etc.).

FIG. 2 shows another embodiment of the invention which will be described only to the extent that it differs from FIG. 1. The same parts are provided with the same reference numbers.

In the drive line following the change speed gear 12, instead of an interaxle differential 24 with multiple disk clutch 26 there are two hydraulically actuated multiple disk clutches 44, 46 via which the front differential 14 and the rear differential 18 can be driven. The multiple disk clutches 44, 46 are positioned in a uniform drive housing 50 and can be moved in a manner which is not shown at the same time or in alternation into the slip region or can be completely closed. At least one of the multiple disk clutches 44, 46, but preferably both, are designed such that they can be used moreover as starting clutches for the vehicle.

When the vehicle is started up out thus the two multiple disk clutches 44, 46 are closed so that if necessary the total drive torque is available.

In driving operation the multiple disk clutches 44, 46 are controlled in the slip region such that a defined drive torque is applied to the front differential 14 and the rear differential 18 with the overriding drive 22. Depending on construction constraints and/or as the driver wishes, this can be manually adjustable for sporting purposes (rear-emphasized, oversteering) or for comfort purposes (neutral or front-emphasized, understeering).

The propulsion distribution device as shown in FIG. 2 with the two slip-controlled multiple disk clutches 44, 46 can moreover route up to 100% of the drive torque to the front differential 14 as described above for FIG. 1 in defined driving situations. This solution with two multiple disk clutches 44, 46 can route up to 100% of the drive torque to the rear differential 18. If the two multiple disk clutches 44, 46 are closed, they act as a differential lock in the longitudinal direction.

Another, alternative embodiment of the invention with simplified control engineering effort is shown in FIG. 3, which in turn is only described to the extent that it differs significantly from FIG. 1. The same parts have the same reference numbers.

As shown in FIG. 3, a self-locking Torsen differential 52 as a propulsion distribution device is inserted into the drive line of the vehicle following the change speed gear 12 as an interaxle differential.

The Torsen differential 52 which is only suggested is of conventional design and based on its construction has the property of being a "torque-sensing" locking differential.

The locking function of the Torsen differential 52 takes place based on the gear ratios in the differential. The Torsen differential 52 can preferably likewise be made rear-emphasized in the basic design, and thus for a defined oversteering tendency of the vehicle the drive torque can be increasingly rerouted to the front differential 14, and the control effort described for FIGS. 1 and 2 can be omitted.

According to the embodiment of one alternative drive line of the vehicle shown in FIG. 4, for essentially the same transmission ratios between the rear differential 18 and the front differential 14 it is provided that an auxiliary gear 27 be connected between the mid-differential 24 and one clutch 26, by means of which a defined rotational speed difference in the clutch 26 can be produced. The auxiliary gear 27 which is made as a counterstage is designed here simply by way of example as a spur gear stage and can also be made alternatively as a ring gear stage or as a planetary gear. With this structure the possibilities described above in conjunction with the embodiment from FIG. 1 arise.

The invention claimed is:

1. A torque transmitting system for an all-wheel drive motor vehicle, comprising:
    a front differential drivingly connected to a front set of wheels;
    a rear differential drivingly connected to a rear set of wheels;
    an interaxle differential actuated by a clutch, drivingly connected to said front and rear differentials;
    an auxiliary gear train drivingly interconnecting said interaxle differential and said clutch for producing a selected rotational speed difference in said clutch;
    a first clutch drivingly interconnecting a change speed gear of said vehicle and said front differential;
    a second clutch drivingly interconnecting said charge speed gear and said rear differential;
    an overriding drive comparable with said rear differential and selectively actuated by a set of clutches, operatively connected to said set of rear wheels, operable to vary the ratios of torque transmitted to said set of rear wheels; and
    an electronic control device programmed
        to determine whether an oversteering tendency of the all-wheel drive motor vehicle exceeds a first defined threshold, wherein the oversteering tendency is detected by one selected from the group consisting of a steering angle of the all-wheel drive motor vehicle, a yaw rate of the all-wheel drive motor vehicle, an acceleration of the rear set of wheels, and combinations thereof;
        upon detection of the oversteering tendency, selectively actuating selected ones of said clutches to perform one selected from the group consisting of reducing the drive torque of the rear differential, increasing the drive torque of the front differential, and combinations thereof;

to determine whether an understeering tendency of the all-wheel drive motor vehicle exceeds a second defined threshold, wherein the understeering tendency is detected by one selected from the group consisting of a steering angle of the all-wheel drive motor vehicle, a yaw rate of the all-wheel drive motor vehicle, an acceleration of the rear set of wheels, and combinations thereof; and upon detection of the understeering tendency, selectively actuating selected ones of said clutches to perform one selected from the group consisting of reducing the drive torque of the front differential, increasing the drive torque of the rear differential.

2. The system according to claim 1 wherein said first and second mentioned clutches are disposed in a housing which is disposed between said charge speed gear box and each of said front and rear differentials.

3. The system according to claim 1 wherein one of said first and second mentioned clutches is functional as a starting clutch of said vehicle.

4. The system according to claim 1 wherein said clutches are controlled by one of an electronic driving stability program and an electronic antislip control of said vehicle.

5. The system according to claim 1 wherein said interaxle differential is a Torsen differential.

6. The system according to claim 1 wherein said auxiliary gear train comprises one selected from a group consisting of a ring gear stage, a planetary gear train and a spur gear.

7. The system according to claim 1 wherein said interaxle differential is an open differential.

8. The system according to claim 1 wherein said interaxle differential is a slip-controlled, multiple clutch.

9. The system according to claim 1 wherein said interaxle differential is a torque-sensing, self locking interaxle differential.

* * * * *